UNITED STATES PATENT OFFICE.

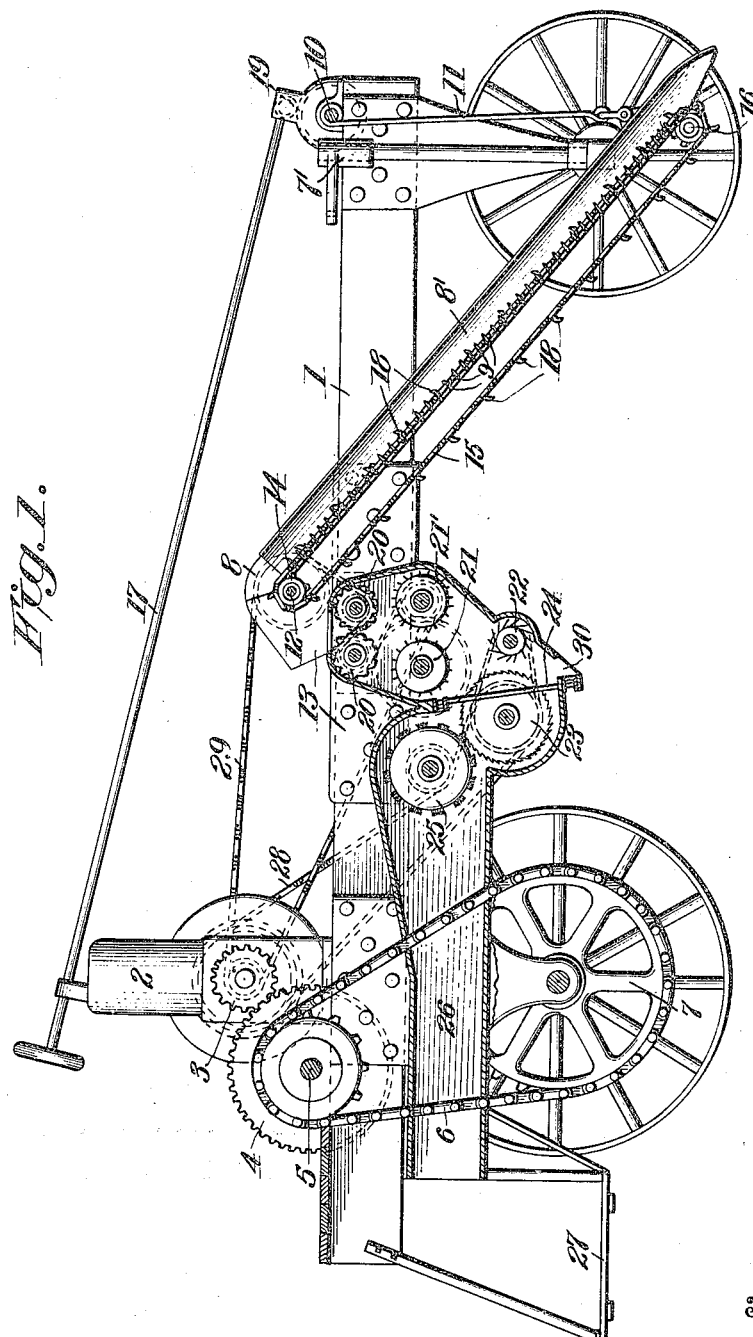

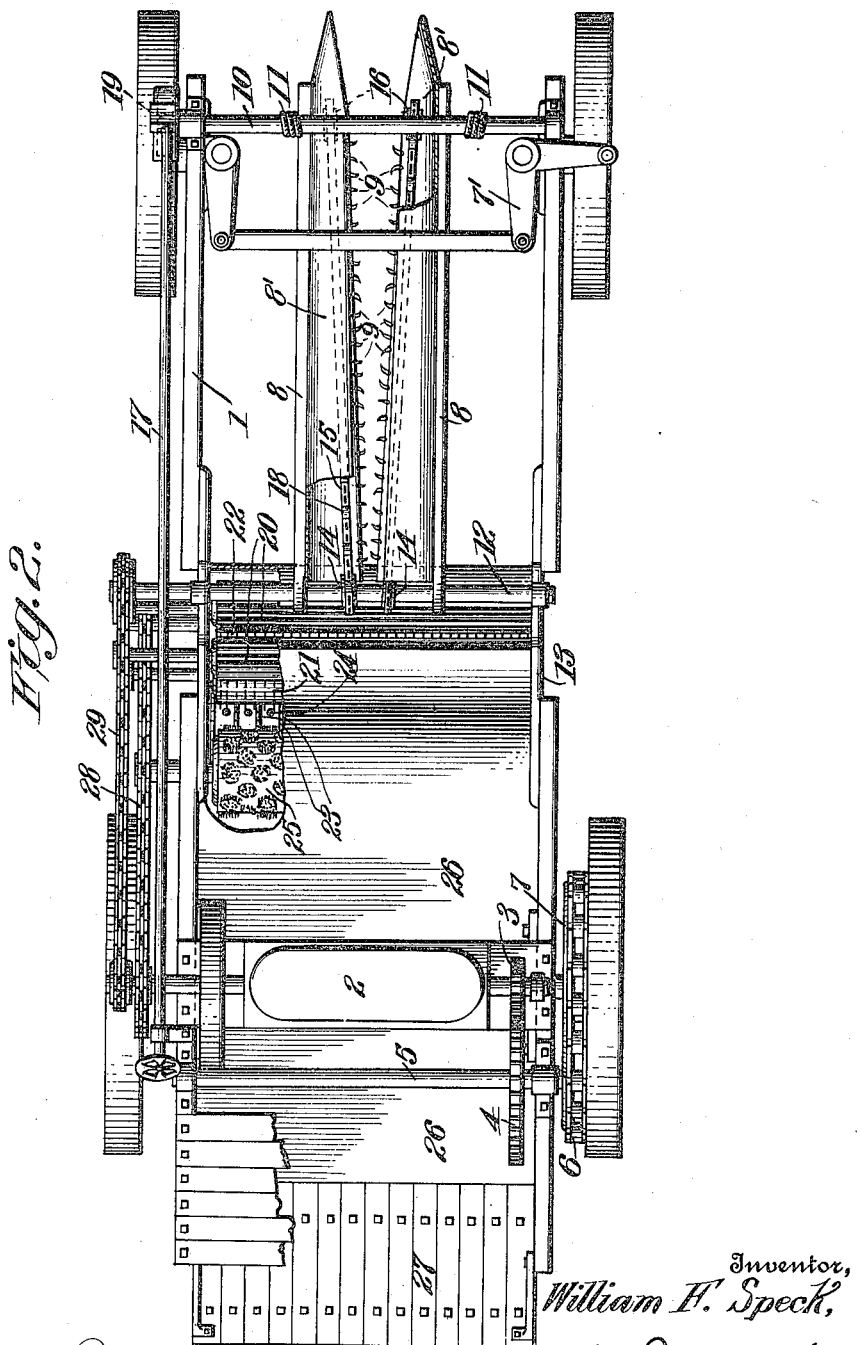

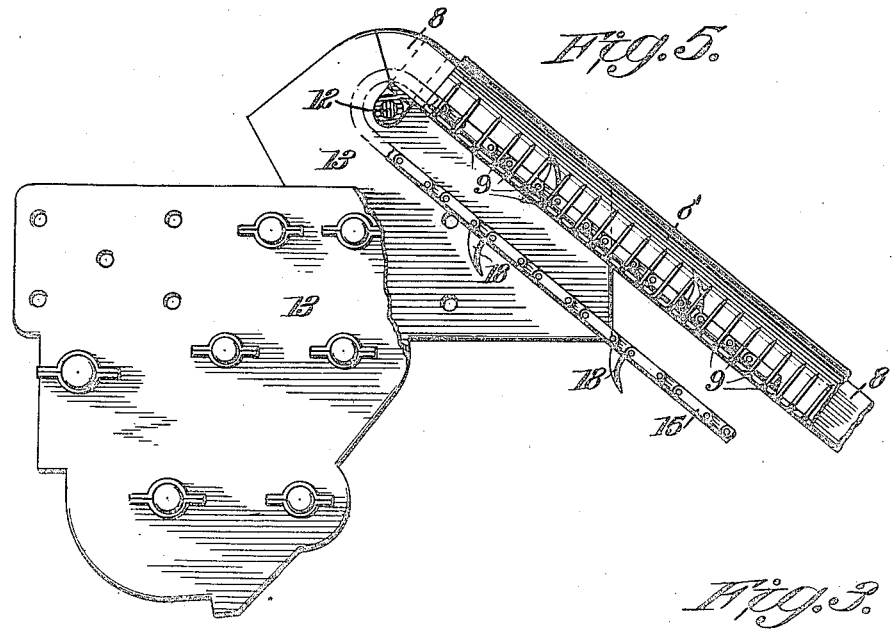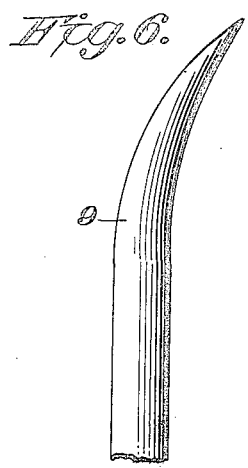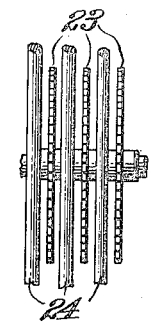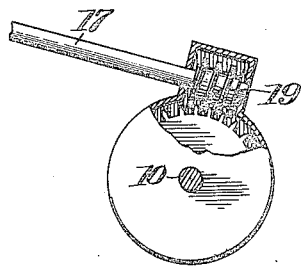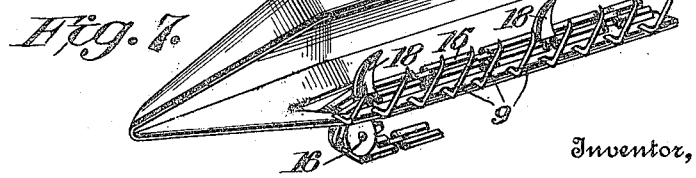

WILLIAM F. SPECK, OF FRENCHMANS BAYOU, ARKANSAS.

COTTON-HARVESTER.

1,153,968.  Specification of Letters Patent.  Patented Sept. 21, 1915.

Application filed November 7, 1910. Serial No. 591,067.

*To all whom it may concern:*

Be it known that I, WILLIAM F. SPECK, a citizen of the United States, residing at Frenchmans Bayou, in the county of Mississippi and State of Arkansas, have invented certain new and useful Improvements in Cotton-Harvesters, of which the following is a specification.

My invention relates to an improved cotton harvester and its object is to provide means whereby as the machine is drawn along by suitable power, the cotton bolls will be stripped from the plants and carried rearwardly and upwardly to suitable mechanism for separating the cotton from the bolls and for cleaning the cotton.

The preferred embodiment of the invention is hereinafter described and illustrated in the accompanying drawings.

In these drawings Figure 1 is a side elevation partly in section of the machine; Fig. 2 a plan view.; Fig. 3, a detail of part of the lifting mechanism for the picking members; Fig. 4, a detail of the gin saws and bars; Fig. 5, a detail side view partly broken away of the casing for the stripping mechanism and part of said mechanism; Fig. 6, a detail of one of the stripping fingers; Fig. 7, a detail perspective showing part of the stripping mechanism.

Referring to the drawings, 1 is the frame or truck of the machine which is driven from an engine 2, mounted thereon by means of a gear 3 on the main shaft of the engine, meshing with the gear 4, keyed to a shaft 5 journaled on the frame 1, to which shaft 5 is also keyed a sprocket wheel, over which passes a chain 6 and this chain also passes over a sprocket wheel 7, keyed to the rear axle of the vehicle. The steering mechanism is designated 7'.

At the front of the vehicle are located two picking or stripping members preferably comprising beams 8 and finger carrying members 8' preferably of metal and which members serve to house conveying chains which are provided with suitable teeth as hereinafter described, for the purpose of taking the cotton bolls from the strippers and conveying them upward to a suitable place of deposit for separating and cleaning. These stripping members are inclined rearwardly at an angle between the horizontal and vertical and are spaced apart sufficiently to permit the entrance of a row of cotton plants between them. Their rear upward ends converge and their lower forward edges diverge for the purpose of readily admitting the plants at the front edge and for closely engaging the plants at the rear edge and thus thoroughly strippings the bolls from the plants. Along the lower inner longitudinal edges of the members 8' are provided boll engaging and stripping fingers or teeth 9 which project inwardly at an angle to the longitudinal axis of each member, the teeth of the opposite members projecting toward one another so that as the plant enters between the members, such teeth will effectually engage the cotton bolls on the plant, and as the machine progresses, will serve to effectually strip the bolls by the relatively upward movement of the members owing to the inclination of the latter. The machine in its travels straddles a row of cotton plants and the stalks of the plants pass between the picking members. By reason of the upward inclination of the members the fingers 9 will pick the cotton at all heights and owing to the convergence of the inner longitudinal edges of said members toward their rear ends, cotton bolls close to the stalk will be effectually stripped therefrom and this convergence also tends to press the branches of the plants closely together, so that a more certain engagement with the bolls will be obtained. Adjacent their front edges, the stripping members are supported from a shaft 10 by cables or ropes 11 and adjacent their rear ends are hung on a shaft 12 which is journaled in a supporting member 13. Sprocket wheels 14 are keyed to shaft 12 and chains 15 pass over said sprocket wheels and over sprocket wheel 16 carried by the beams 8 at the base of the latter. These chains 15 at intervals are provided with special links having curved teeth 18 and as each chain is in close proximity to the boll stripping fingers of the respective members, the chain teeth convey the cotton bolls as they are stripped by the fingers upwardly and deliver the same to separating and cleaning mechanism, which will be hereinafter described.

One end of the cable 11 is fastened to the shaft 10 and the picking members may be raised or lowered by winding or unwinding the cable around the shaft as the case may be, by means of the hand-wheel operated rod 17, and worm gearing 19. The rod 17 is suitably supported on the frame of the machine and the worm gearing 19 is secured within a casing.

The separating and cleaning mechanism for the cotton is supported within a box forming part of the supporting member 13. The stalks carried upwardly by chains 15 are delivered onto corrugated rollers 20 and pass between the same onto spiked rollers 21 and 21' and between the spiked rollers onto a spiked roller 22 and thence to a series of gin saws 23 which revolve between bars 24. The cotton is removed from the saws by a revolving brush 25 and after being so removed it is conducted through a chute 26 and into bags or other receptacles which are supported on a platform 27 of the machine.

The brush 25, the gin saws 23 and spiked roller 22 have shafts journaled in the member 13 and beyond said member on each shaft is keyed a sprocket wheel, and a single chain 28 passing over a sprocket wheel on the main shaft of the engine and also over all the sprockets just described, thereby driving the brush, saws and spiked roller. A second sprocket chain 29 connected to the main shaft of the engine in a manner similar to chain 28 passes over sprocket wheels keyed to the shafts of the corrugated rollers 20, and spiked rollers 21 and 21' and shaft 12 and thereby drives said corrugated rollers and spiked rollers and the toothed chain 15.

The cotton together with burs, stalks or other trash which may have been gathered with it, first passes through the corrugated rollers 20 of the cleaning mechanism and the stalks or trash are broken up in its passage between the rollers. After passing between the rollers 20, the cotton together with the broken husks and stalks fall onto the spiked rollers 21 and 21'. The roller 21 is driven at greater speed than the roller 21' as it has a smaller sprocket wheel. The rollers 21, 21' serve to tear up the cotton into proper shape for the gin saws. After passing between these rollers the cotton together with the broken husks, stalks or other trash falls upon the spiked roller 22. The shaft to which roller 22 is keyed has a small sprocket wheel and therefore is driven at greater speed than the gin saws. From this roller the cotton is thrown onto the gin saws. Some of the husks, stalks or other trash will fall from the cotton and through an opening 30 in the supporting member beneath the saws, as the cotton is thrown onto the saws, or the trash may fall against the adjacent slanting wall of the supporting member and thence through the opening. The bars 24 serve to prevent the trash from passing to the saws. Should trash pass the bars, it will be separated from the cotton by the gin saws and fall therefrom through the opening 30. The cleaned cotton is removed from the gin saws by the revolving brush 24. Such cleaned cotton is blown through the chute 26, as it is removed from the gin saws, into sacks or receptacles on the platform 27 by the force of the air created by the revolving action of the brush.

It is clear that various changes in the details of construction of the machine may be made without departing from the spirit and scope of my invention.

Having thus described my invention, what I claim is:

1. In a cotton harvester, separated, rigidly mounted boll engaging members extending from front to rear of the line of travel of the machine and having rigidly mounted teeth projecting angularly from said members and said members operable to straddle a row of plants and engage and strip the bolls as the machine is moved along, substantially as described.

2. In a cotton harvester, the combination with two separated rigid members operable to straddle a row of plants and extending from the front of the machine rearwardly, of boll engaging teeth fixedly mounted on the inner longitudinal edges of said members at an angle thereto, the teeth of the opposite members extending toward one another, substantially as described.

3. In a cotton harvester, the combination with rigidly mounted members extending longitudinally in the line of travel of the machine and having fixed teeth on the inner longitudinal edges of said members, the teeth of the opposite members projecting toward one another and adapted to engage and gather the bolls as the harvester is moved along the row, of means for continuously stripping the bolls from the toothed members and conveying them rearwardly to suitable receiving means, substantially as described.

4. In a cotton harvester, the combination with fixed members at the front of the machine operable to straddle a row of plants, of fixed teeth on the inner longitudinal edges of said members, the teeth of the opposite members extending toward one another angularly to the line of draft and adapted to engage the cotton bolls, said rows of teeth converging from the front toward the rear of said members, substantially as described.

5. In a cotton harvester, the combination with fixed members having teeth projecting from their longitudinal edges at an angle to the line of draft, said members converging from their front toward their rear ends and extending upwardly and rearwardly at an angle between the horizontal and the vertical and conveying means adjacent each of said toothed members and extending substantially parallel to the length thereof for taking the cotton bolls from said members and delivering them to suitable receiving means, substantially as described.

6. In a cotton harvester, the combination with fixed rearwardly and upwardly inclined boll stripping members, provided with angularly projecting teeth on their inner longitudinal opposite edges, said members being provided at their forward ends with angle portions adapted to receive and guide the stalks and a conveying member mounted in each of said toothed members and extending substantially parallel to the length thereof and means for driving said conveying members, substantially as described.

In testimony whereof I have affixed my signature in presence of two witnesses.

WILLIAM F. SPECK.

Witnesses:
JOHN W. FARLEY,
JOHN C. GEBHART.

Copies of this patent may be obtained for five cents each, by addressing the "Commissioner of Patents, Washington, D. C."